United States Patent
Vassilieva et al.

(10) Patent No.: US 9,673,907 B1
(45) Date of Patent: Jun. 6, 2017

(54) CONSTELLATION SHAPING OF MODULATION FORMATS FOR OPTICAL COMMUNICATION SYSTEMS

(71) Applicant: Fujitsu Limited, Kawaski-shi, Kanagawa (JP)

(72) Inventors: Olga Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/084,207

(22) Filed: Mar. 29, 2016

(51) Int. Cl.
*H04B 10/00* (2013.01)
*H04B 10/516* (2013.01)
*H04B 10/079* (2013.01)

(52) U.S. Cl.
CPC ... *H04B 10/5161* (2013.01); *H04B 10/07953* (2013.01)

(58) Field of Classification Search
CPC .............. H04B 10/00; H04B 10/07953; H04B 10/0799; H04B 10/5161; H04J 14/02; H04J 14/0221
See application file for complete search history.

(56) References Cited

U.S. PATENT DOCUMENTS

| | | | | |
|---|---|---|---|---|
| 2011/0085624 | A1* | 4/2011 | Djordjevic | H04B 10/532 375/341 |
| 2016/0192042 | A1* | 6/2016 | Mitchell | H04Q 11/0005 398/48 |

OTHER PUBLICATIONS

Corning® LEAF® Optical Fiber Product Information, P11107, TL9000/ISO 9001 Certified. Corning Incorporated, www.corning.com/opticalfiber; 2 pages, Jul. 2014.

Wo, et al., "Superposition Mapping with Application in Bit-Interleaved Coded Modulation," In Proceedings of the International ITG Conference on Source and Channel Coding (SCC'10); 6 pages, 2010.

Barbieri, Alessandro, "A Guide to Select Single-Mode Fibers for Optical Communications Applications," Cisco Systems, Inc.; 37 pages, 2002.

Lotz, T.H., et al., "Coded PDM-OFDM Transmission with Shaped 256-Iterative-Polar-Modulcation Achieving 11.15-b/s/Hz Intrachannel Spectral Efficiency and 800-km Reach," Journal of Lighwave Technology, vol. 31, No. 4, 8 pages, Feb. 15, 2013.

J. Estaran et al., "Capacity-Approaching Superposition Coding for Optical Fiber Links," Journal of Lightwave Technology, vol. 32, No. 17, pp. 2960-2972; 13 pages, Sep. 1, 2014.

X. Liu et al., "Generation and FEC-Decoding of a 231.5-Gb/s PDM-OFDM Signal with 256-Iterative-Polar_Modulation Achieving 11.12-b/s/Hz lntrachannel Spectral Efficiency and 800-km Reach", OFC'2012, NOFEC post-deadline paper, PDP5B.3; 3 pages, 2012.

T. Fehenberger et al., "LDPC Coded Modulation with Probabilistic Shaping for Optical Fiber Systems", OFC'2015, paper Th2A.23, 3 pages, 2015.

* cited by examiner

*Primary Examiner* — Ted Wang
(74) *Attorney, Agent, or Firm* — Baker Botts L.L.P.

(57) ABSTRACT

Methods and systems for constellation shaping of modulation formats in optical communication systems may involve enabling an optical transport network to activate/deactivate constellation shaping on a per channel basis for a given optical path using universal programmable transceivers. Then, constellation shaping may be activated to increase the reach of optical channels by improving signal-to-noise ratio over the optical path.

24 Claims, 5 Drawing Sheets

CONSTELLATION SHAPING OF MODULATION FORMATS FOR OPTICAL COMMUNICATION SYSTEMS

BACKGROUND

Field of the Disclosure

The present disclosure relates generally to optical communication networks and, more particularly, to constellation shaping of modulation formats for optical communication systems.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission.

SUMMARY

In one aspect, a disclosed first method is for constellation shaping of modulation formats in optical transport networks. The first method may include receiving path information specifying attributes of an optical path in an optical network. In the first method, the path information may include a distance of the optical path and a number of optical channels transmitted over the optical path. Based on the path information, the first method may also include identifying a first modulation format for an optical channel transmitted over the optical path. In the first method, the first modulation format may have a uniform distribution of constellation points in the complex plane. When a first bit error rate (BER) for the optical channel using the first modulation format over the distance exceeds a threshold value, the first method may include identifying a second modulation format for the optical channel. In the first method, the second modulation format may have a non-uniform distribution of constellation points in the complex plane and may result in a second BER for the distance that does not exceed the threshold value. The first method may further include sending a first command to an optical transmitter for the optical path to use the second modulation format for the optical channel, sending a second command to an optical receiver for the optical path to use the second modulation format for the optical channel, and transmitting the optical channel over the optical path using the second modulation format.

In any of the disclosed embodiments of the first method, the second modulation format may have a Gaussian-like distribution of constellation points in the complex plane.

In any of the disclosed embodiments of the first method, the first modulation format provides maximum data throughput capacity available in the optical network for the distance using the uniform distribution of constellation points in the complex plane.

In any of the disclosed embodiments of the first method, the second modulation format is based on at least one of: superposition coded mapping using phase-shifted modulation, superposition coded mapping using bit-interleaved coded modulation, iterative polar modulation, or low-density parity check coded modulation with probabilistic shaping.

In any of the disclosed embodiments of the first method, the first modulation format is based on at least one of: quadrature amplitude modulation or quadrature phase shift keying.

In any of the disclosed embodiments of the first method, the optical channels are included in a superchannel.

In another aspect, a disclosed second method is for constellation shaping of modulation formats in optical transport networks. The second method may include monitoring a first BER of an optical channel transmitted over an optical path in an optical network using a first modulation format over a distance. In the second method, the first modulation format has a uniform distribution of constellation points in quadrature space. When a first BER for the optical channel using the first modulation format over the distance exceeds a threshold value, the second method may include identifying a second modulation format for the optical channel. In the second method, the second modulation format may have a non-uniform distribution of constellation points in the complex plane and may result in a second BER for the distance that does not exceed the threshold value. The second method may further include sending a first command to an optical transmitter for the optical path to use the second modulation format for the optical channel, sending a second command to an optical receiver for the optical path to use the second modulation format for the optical channel, and transmitting the optical channel over the optical path using the second modulation format.

In any of the disclosed embodiments of the second method, the second modulation format may have a Gaussian-like distribution of constellation points in the complex plane.

In any of the disclosed embodiments of the second method, the first modulation format provides maximum data throughput capacity available in the optical network for the distance using the uniform distribution of constellation points in the complex plane.

In any of the disclosed embodiments of the second method, the second modulation format is based on at least one of: superposition coded mapping using phase-shifted modulation, superposition coded mapping using bit-interleaved coded modulation, iterative polar modulation, or low-density parity check coded modulation with probabilistic shaping.

In any of the disclosed embodiments of the second method, the first modulation format is based on at least one of: quadrature amplitude modulation or quadrature phase shift keying.

In any of the disclosed embodiments of the second method, the optical channels are included in a superchannel.

Additional disclosed aspects include an optical transport network enabled to implement the first method or the second method.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
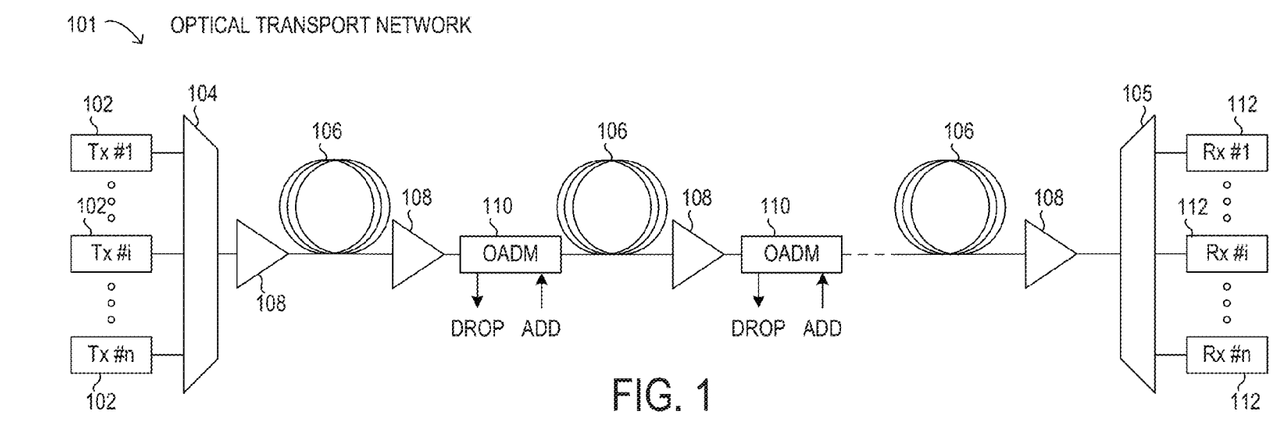
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 3) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16-QAM or 64-QAM, may be used to increase transmission capacity per wavelength channel. The advanced modulation formats may be applied using transmitter 102 and receiver 112. However, the use of advanced modulation formats may result in decreased transmission reach (also referred to simply as 'reach') of the optical signal. For example, the reach may be determined by an acceptable value for bit rate error (BER), and accordingly OSNR, which may be observed at receivers 112.

Another strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, superchannels do not extend the transmission reach of optical signals using optical transport network 101

In operation of optical transport network 101, in order to extend the transmission reach of certain optical signals, such as high capacity optical signals modulated using an advanced modulation format, constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or m-QAM), the symbols exhibit a uniform distribution in the complex plane, shown as uniformly distribution constellation points in a constellation diagram. When constellation shaping is applied to a modulation formation, the distribution of the symbols in the complex plane is changed to provide an improved mapping for noise tolerance. In some instances, the distribution of symbols may be a Gaussian or Gaussian-like distribution that is shown as non-uniform constellation points in the constellation diagram (see also FIG. 4).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/demapping functionality, such as within a digital signal processing (DSP) module, to enable implementation of constellation shaping in optical transport network 101.

For example, constellation shaping may involve superposition mapping, as described in Equation 1.

$$y = y_I + j y_Q = \Sigma_{n=1}^{N} e^{j \pi b_n} h_n \quad \text{Equation (1)}$$

In Equation 1:
y is the optical signal comprised of modulated symbols;
$y_I$ and $y_Q$ are the in-phase (real) and quadrature (imaginary) quadrature components;
N is the number of bits per symbol;
$b_n$ are the encoded binary bits; and
$h_n$ represents a weighted symbol mapping scheme, given by $h_n = \alpha_n e^{j \theta_n}$, where $\alpha_n$ is an amplitude power factor and $\theta_n$ is a phase power factor.

Thus, $h_n$ allocates a certain amplitude and phase to each symbol. By tuning the amplitude power factor $\alpha_n$ and the phase power factor $\theta_n$, different superposition mapping schemes can be implemented. For example, in superposition coded mapping using phase-shifted modulation (PSM), the amplitude power factor $\alpha_n$ is kept constant and the phase power factor $\theta_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and demapping at the receiver may involve iterative operations.

In addition to superposition mapping, other constellation shaping techniques include iterative polar modulation (IPM) and low-density parity check coded modulation with probabilistic shaping.

As will be described in further detail herein, methods and systems are disclosed for constellation shaping of modulation formats in optical transport network 101. For example, as noted, the advantages of using flexible grid networks may depend or rely on the modulation format and the spectral spacing between optical channels, where a closer spacing provides greater capacity utilization. However, nonlinear interactions between closely spaced optical channels (or subcarriers within a superchannel) may limit transmission reach even further. Thus, constellation shaping, as disclosed herein, may be employed, in addition to a desired modulation format, to extend the reach of optical signals.

Specifically, in optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

Figure 2:
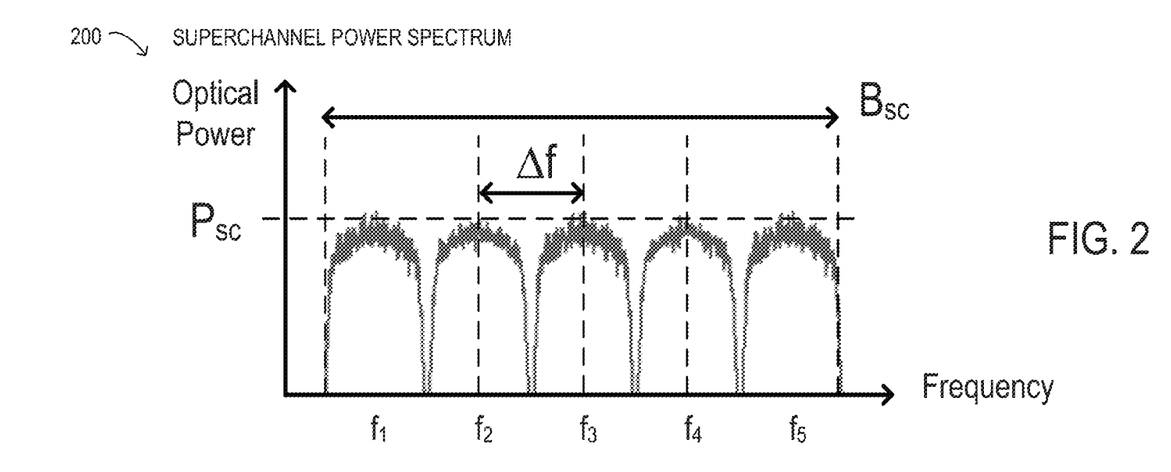
FIG. 2 shows selected elements of an embodiment of a superchannel power spectrum.

Referring to FIG. 2, selected elements of an embodiment of a superchannel is shown as superchannel power spectrum 200, which depicts five (5) subcarriers. While the data used for superchannel power spectrum 200 are not actual measured values, the illustrated power spectrum may be characteristic of an actual superchannel. In superchannel power spectrum 200, the subcarriers may each be modulated with 200 GB/s DP-16-QAM signals. Furthermore, each subcarrier band has been subject to electrical Nyquist pulse shaping in the transmitter using a root raised cosine method using a roll-off factor of 0.15. As shown in FIG. 2, $B_{SC}$ represents the fixed superchannel transmission band, while $\Delta f$ represents the subcarrier frequency spacing. In certain embodiments, the subcarrier frequency spacing $\Delta f$ may be 35 GHz and may be uniform between each center frequency $f_1$, $f_2$, $f_3$, $f_4$, and $f_5$, respectively corresponding to the subcarriers. The subcarrier frequency spacing $\Delta f$ may be selected to be wide enough to prevent any significant linear crosstalk between adjacent subcarriers. The optical signal of each subcarrier may be multiplexed using an optical coupler to form the single superchannel in the fixed transmission band $B_{SC}$ having an aggregate data rate of 1 Tb/s, for example. It is noted that different values for the fixed superchannel transmission band, $B_{SC}$, the subcarrier frequency spacing $\Delta f$, and the overall aggregate data rate may result in superchannel power spectrum 200. Also shown in FIG. 2 is constant power level, $P_{SC}$, that is a power level for the superchannel that is substantially similar or equal for each of the 5 subcarriers, such that $P_{SC}$, may correspond to an average power level for each of the subcarriers.

In typical DWDM networks, it is known that system performance may depend on an allocation of each wavelength channel on the wavelength grid, such that a longer wavelength channel may suffer from smaller nonlinear impairments compared to a shorter wavelength channel. In case of superchannel-based WDM systems, in addition to the wavelength dependency of the subcarrier error rate across the transmission band, such as the C-band, a dependency of individual subcarrier error rate (or OSNR at the receiver) on spectral allocation of the subcarrier within the superchannel has now been observed in the form of nonlinear impairments (such as cross-talk). Linear cross-talk may be observed between two adjacent subcarriers (inter-subcarrier) and may depend on a degree or extent of overlap in the frequency domain of the adjacent subcarriers. The use of Nyquist pulse shaping, as shown in FIG. 2, may represent an effective means for maintaining a minimum level of linear cross-talk between adjacent subcarriers, at least in part due to the nearly vertical edges of the Nyquist-shaped subcarriers (spectral pulses) that do not substantially overlap each other in the frequency domain. Non-linear cross-talk may also be observed and may arise from nonlinear interactions during fiber transmission.

The nonlinear interactions may include phenomena such as cross-phase modulation (XPM), self-phase modulation (SPM), and four-wave mixing, among others. Cross-phase modulation may occur when phase information, amplitude information, or both from one channel is modulated to an adjacent channel in the superchannel. Self-phase modulation may arise when a variation in the refractive index (or a dependency of the refractive index on intensity) results in a phase shift within each subcarrier. In four-wave mixing, three wavelengths may interact to create a fourth wavelength that may coincide with a wavelength of a subcarrier, and may lead to undesirable variations in peak power or other types of signal distortion on the affected subcarrier. Furthermore, nonlinear cross-talk may comprise inter-subcarrier components. Since nonlinear interactions occur during fiber transmission and may not depend on a degree of overlap of the subcarrier frequency bands, Nyquist pulse shaping may be ineffective in resolving certain problems with nonlinear cross-talk in a superchannel.

When superchannels are transmitted using optical transport network 101, each individual subcarrier may be subject to constellation shaping, as disclosed herein.

Figure 3:
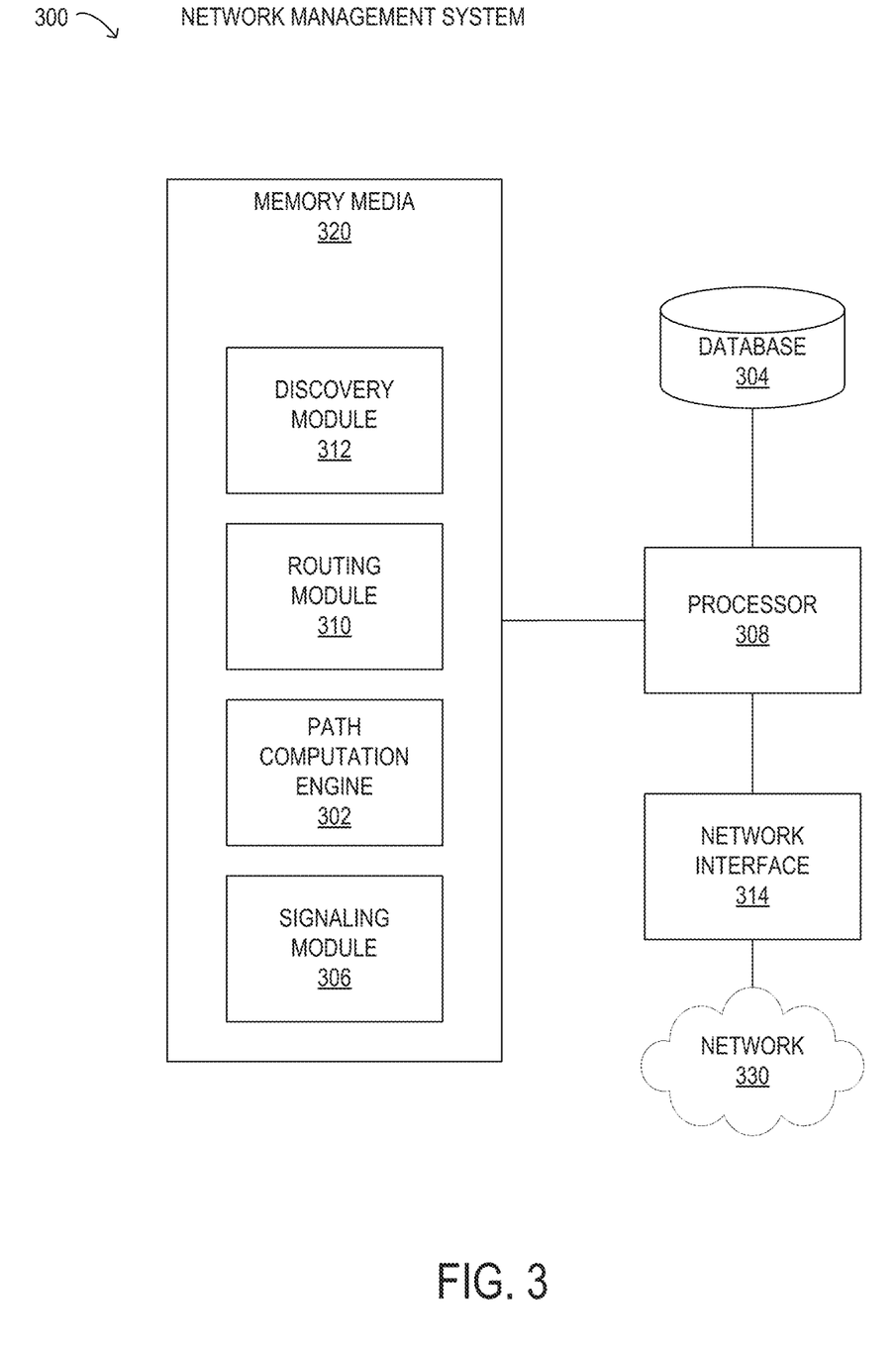
FIG. 3 is a block diagram of selected elements of an embodiment of an optical control plane system for superchannel subcarrier monitoring.

Referring now to FIG. 3, a block diagram of selected elements of an embodiment of control system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by control system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, control system 300 includes processor 308 and memory media 320, which may store executable instructions (i.e., executable code) that may be executable by processor 308, which has access to memory media 320. Processor 308 may execute instructions that cause control system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312, and routing module 310.

Also shown included with control system 300 in FIG. 3 is network interface 314, which may be a suitable system, apparatus, or device operable to serve as an interface between processor 308 and network 330. Network interface 314 may enable control system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. Network 330 may also include certain portions of a network using galvanic or electronic media. In certain embodiments, network 330 may include at least certain portions of a public network, such as the Internet. Network 330 may be implemented using hardware, software, or various combinations thereof.

In certain embodiments, control system 300 may be configured to interface with a person (a user) and receive data about the optical signal transmission path. For example, control system 300 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 300 may be configured to receive data about the optical signal transmission path from a device such as another computing device or a network element, for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in an optical network, such as optical transport network 101. For example, when an ingress node in the optical network receives a service request, control system 300 may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of control system 300, path computation engine 302, or another entity or module, may provide path information associated with a given optical path, such as a distance, a number and type of optical channels to be transmitted, a fiber type, and a dispersion map. For example, signaling module 306, or another entity or module, may receive the path information and may decide on a type of modulation format and whether or not to use constellation shaping for the optical channels transmitted over the optical path. In order to activate or deactivate constellation shaping, signaling module 306 may send a first command to each transmitter for each of the optical channels, respectively. Then, signaling module 306 may send a second command to each receiver corresponding to each transmitter to activate or deactivate constellation shaping. Transmitters and receivers having universal programmable transponder functionality may receive the commands from signaling module 306 and may then activate or deactivate transmission of the optical channels using constellation shaping.

Figure 4:
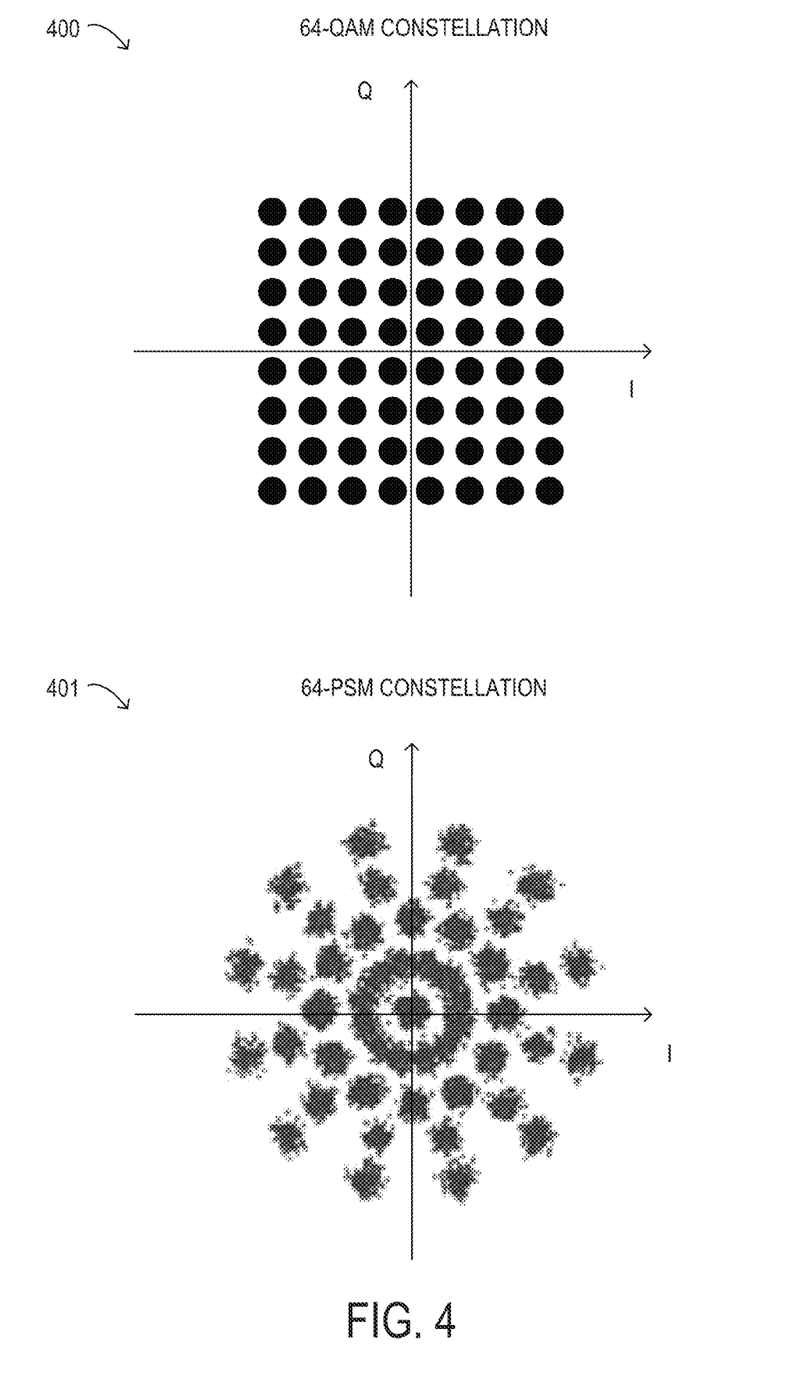
FIG. 4 shows selected elements of embodiments of constellation diagrams in the complex plane.

Referring now to FIG. 4, selected elements of an embodiment of constellation diagrams in the complex plane are shown. In constellation diagram 400, a 64-QAM constellation is shown having a uniform distribution of the constellation points. In constellation diagram 401, a 64-PSM constellation is shown having a non-uniform distribution of constellation points as an example of constellation shaping, as disclosed herein. In certain embodiments, the 64-PSM constellation has a Gaussian-like distribution of the constellation points. It is noted that 64-PSM, as shown in constellation diagram 401, may exhibit a shaping gain in OSNR of up to 0.5 dB as compared to 64-QAM, as shown in constellation diagram 400. As a result of the shaping gain, the maximum reach of channels using 64-PSM, as compared to 64-QAM, may be increased.

In one example of determining a modulation format and whether or not to use constellation shaping, Table 1 lists reach versus modulation format for a given fiber type and optical channel configuration.

TABLE 1

Maximum Reach for Different Modulation Formats

| Modulation Format | Maximum Reach [km] | Maximum shaping gain [dB] |
|---|---|---|
| 64-QAM | 100 km | n/a |
| 64-PSM | 112 km | 0.5 dB |
| 16-QAM | 400 km | n/a |
| 16-PSM | 430 km | 0.3 dB |

In Table 1, based on a desired reach, a corresponding modulation format that does not exceed the desired reach may be selected. Because 64-PSM and 16-PSM involve constellation shaping that can be activated or deactivated in the optical network on demand, additional reach due to the shaping gain realized with constellation shaping may be made readily available. Thus, constellation shaping of modulation formats in optical communication systems, as disclosed herein, may provide a flexible method for increasing reach of a given transmission capacity. Without the ability to activate constellation shaping for an optical path, as described herein, conventional methods of increasing the reach, such as using expensive optical-electronic-optical (O-E-O) converters, may be more costly to implement, which is undesirable.

Figure 5:
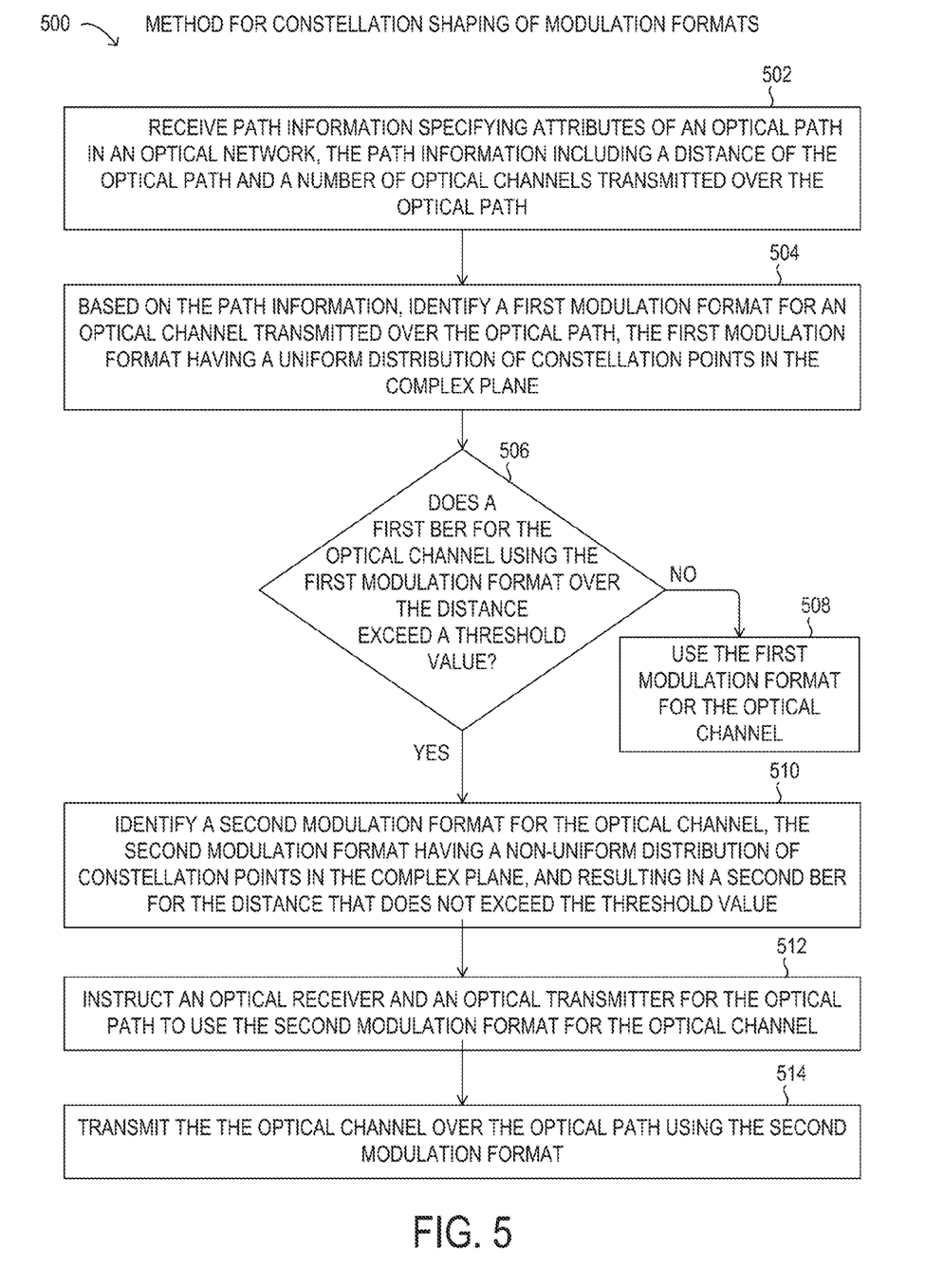
FIG. 5 is a flow chart of selected elements of a method for constellation shaping of modulation formats.

Referring now to FIG. 5, a block diagram of selected elements of an embodiment of method 500 for constellation shaping of modulation formats, as described herein, is depicted in flowchart form. Method 500 may be performed using optical transport network 101. In some embodiments, network management system 300 may be used to obtain path information as well as send commands to optical transmitters and optical receivers, as described above. Although method 500 is described in the singular in terms of an optical channel among a plurality of optical channels, it will be understood that operations in method 500 may be repeated or duplicated, either in parallel or in serial, for any plurality of the optical channels. It is noted that certain operations described in method 500 may be optional or may be rearranged in different embodiments.

Method 500 may begin at step 502 by receiving path information specifying attributes of an optical path in an optical network, the path information including a distance of the optical path and a number of optical channels transmitted over the optical path. The optical channels may be configured as a superchannel. Based on the path information, at step 504, a first modulation format is identified for an optical channel transmitted over the optical path, the first modulation format having a uniform distribution of constellation points in the complex plane. At step 506, a decision may be made whether a first BER for the optical channel using the first modulation format over the distance exceeds a threshold value. The first BER may be measured at a receiver or may be calculated using the path information, among other variables, for example, using path computation engine 302 (see FIG. 3). When the result of step 506 is NO and the first BER does not exceed the threshold value, at step 508 the first modulation format may be used for the optical channel. When the result of step 506 is YES and the first BER exceeds the threshold value, at step 510 a second modulation format is identified for the optical channel, the second modulation format having a non-uniform distribution of constellation points in the complex plane, and resulting in a second BER for the distance that does not exceed the threshold value. The second modulation format in step 510 may result from constellation shaping of the first modulation format. At step 512, an optical receiver and an optical transmitter for the optical path are instructed to use the second modulation format for the optical channel. Step 512 may include sending command(s) to the optical receiver and to the optical transmitter to use the second modulation format, such as by activating constellation shaping. The optical receiver and the optical transmitter may include universal programmable transceivers, as described above. At step 514, the optical channel is transmitted over the optical path using the second modulation format.

Figure 6:
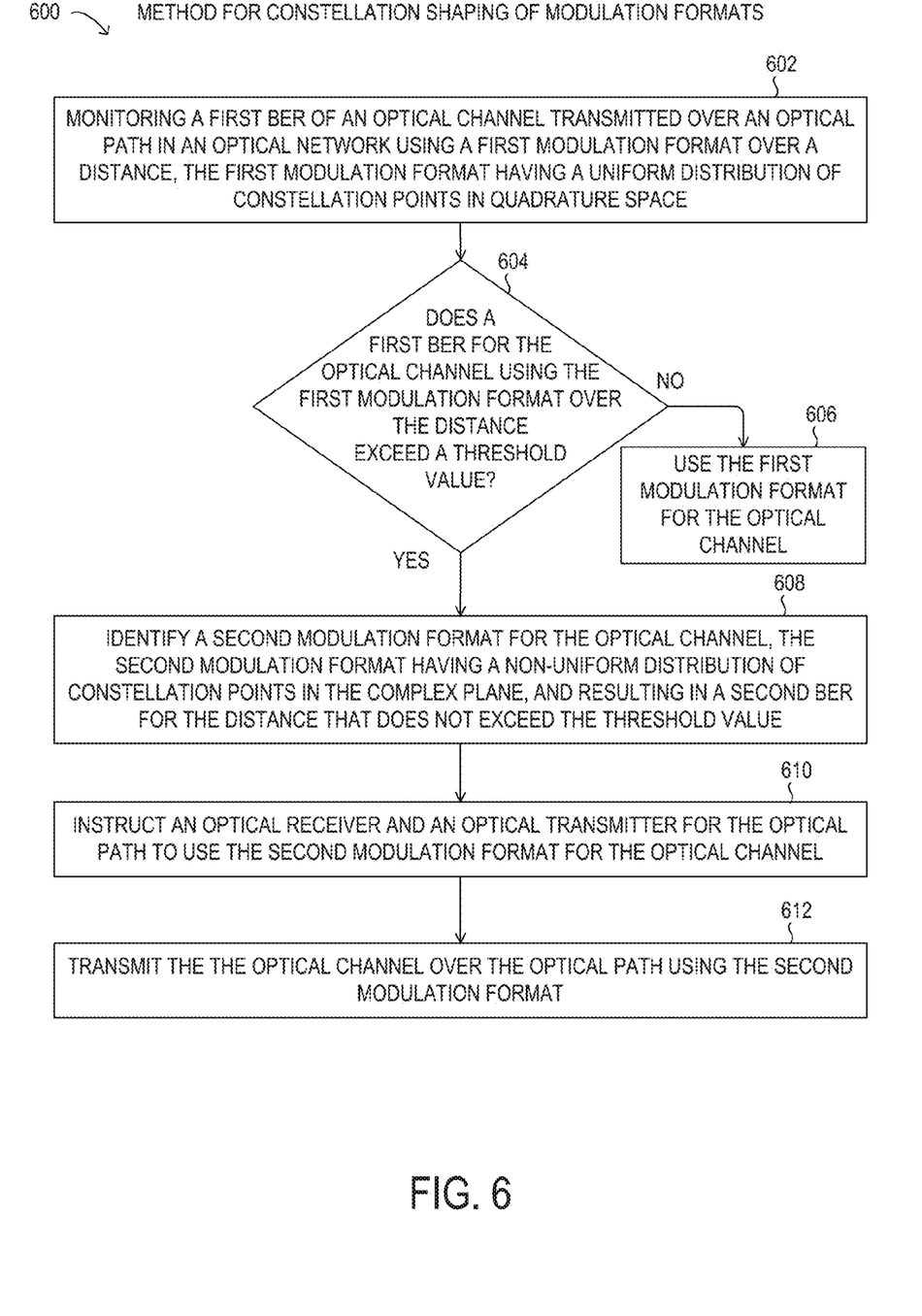
FIG. 6 is a flow chart of selected elements of a method for constellation shaping of modulation formats.

Referring now to FIG. 6, a block diagram of selected elements of an embodiment of method 600 for constellation shaping of modulation formats, as described herein, is depicted in flowchart form. Method 600 may be performed using optical transport network 101. In some embodiments, network management system 300 may be used to obtain path information as well as send commands to optical transmitters and optical receivers, as described above. Although method 600 is described in the singular in terms of an optical channel among a plurality of optical channels, it will be understood that operations in method 600 may be repeated or duplicated, either in parallel or in serial, for any plurality of the optical channels. It is noted that certain operations described in method 600 may be optional or may be rearranged in different embodiments.

Method 600 may begin at step 602 by monitoring a first BER of an optical channel transmitted over an optical path in an optical network using a first modulation format over a distance, the first modulation format having a uniform distribution of constellation points in the complex plane. The optical channels may be configured as a superchannel. At step 604, a decision may be made whether a first BER for the optical channel using the first modulation format over the distance exceeds a threshold value. The first BER may be measured at a receiver or may be calculated using the path information, among other variables, for example, using path computation engine 302 (see FIG. 3). When the result of step 604 is NO and the first BER does not exceed the threshold value, at step 606 the first modulation format may be used for the optical channel. When the result of step 604 is YES and the first BER exceeds the threshold value, at step 608 a second modulation format is identified for the optical channel, the second modulation format having a non-uniform distribution of constellation points in the complex plane, and resulting in a second BER for the distance that does not exceed the threshold value. The second modulation format in step 608 may result from constellation shaping of the first modulation format. At step 610, an optical receiver and an optical transmitter for the optical path are instructed to use the second modulation format for the optical channel. Step 610 may include sending command(s) to the optical receiver and to the optical transmitter to use the second modulation format, such as by activating constellation shaping. The optical receiver and the optical transmitter may include universal programmable transceivers, as described above. At step 612, the optical channel is transmitted over the optical path using the second modulation format.

As disclosed herein, methods and systems for constellation shaping of modulation formats in optical communication systems may involve enabling an optical transport network to activate/deactivate constellation shaping on a per channel basis for a given optical path using universal programmable transceivers. Then, constellation shaping may be activated to increase the reach of optical channels by improving signal-to-noise ratio over the optical path.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for constellation shaping of modulation formats in optical transport networks, the method comprising:
   receiving path information specifying attributes of an optical path in an optical network, wherein the path information includes a distance of the optical path and a number of optical channels transmitted over the optical path;
   based on the path information, identifying a first modulation format for an optical channel transmitted over the optical path, wherein the first modulation format has a uniform distribution of constellation points in the complex plane;
   when a first bit error rate (BER) for the optical channel using the first modulation format over the distance exceeds a threshold value, identifying a second modulation format for the optical channel, wherein the second modulation format has a non-uniform distribution of constellation points in the complex plane, and wherein the second modulation format results in a second BER for the distance that does not exceed the threshold value;
   sending a first command to an optical transmitter for the optical path to use the second modulation format for the optical channel;
   sending a second command to an optical receiver for the optical path to use the second modulation format for the optical channel; and
   transmitting the optical channel over the optical path using the second modulation format.

2. The method of claim 1, wherein the second modulation format has a Gaussian-like distribution of constellation points in the complex plane.

3. The method of claim 1, wherein the first modulation format provides maximum data throughput capacity available in the optical network for the distance using the uniform distribution of constellation points in the complex plane.

4. The method of claim 1, wherein the second modulation format is based on at least one of superposition coded mapping using phase-shifted modulation, superposition coded mapping using bit-interleaved coded modulation, iterative polar modulation, or low-density parity check coded modulation with probabilistic shaping.

5. The method of claim 1, wherein the first modulation format is based on at least one of quadrature amplitude modulation or quadrature phase shift keying.

6. The method of claim 1, wherein the optical channels are included in a superchannel.

7. A method for constellation shaping of modulation formats in optical transport networks, the method comprising:
   monitoring a first bit error rate (BER) of an optical channel transmitted over an optical path in an optical network using a first modulation format over a distance, wherein the first modulation format has a uniform distribution of constellation points in quadrature space;
   when the first BER for the optical channel over the distance exceeds a threshold value, identifying a second modulation format for the optical channel, wherein the second modulation format has a non-uniform distribution of constellation points in quadrature space, and wherein the second modulation format results in a second BER for the distance that does not exceed the threshold value;
   sending a first command to an optical transmitter for the optical path to use the second modulation format for the optical channel;
   sending a second command to an optical receiver for the optical path to use the second modulation format for the optical channel; and transmitting the optical channel over the optical path using the second modulation format.

8. The method of claim 7, wherein the second modulation format has a Gaussian-like distribution of constellation points in the complex plane.

9. The method of claim 7, wherein the first modulation format provides maximum data throughput capacity available in the optical network for the distance using the uniform distribution of constellation points in the complex plane.

10. The method of claim 7, wherein the second modulation format is based on at least one of superposition coded mapping using phase-shifted modulation, superposition coded mapping using bit-interleaved coded modulation, iterative polar modulation, or low-density parity check coded modulation with probabilistic shaping.

11. The method of claim 7, wherein the first modulation format is based on at least one of quadrature amplitude modulation, or quadrature phase shift keying.

12. The method of claim 7, wherein the optical channels are included in a superchannel.

13. An optical transport network for constellation shaping of modulation formats, the optical transport network comprising:
   an optical transmission path, including an optical transmitter and an optical receiver; and
   a network management system enabled to:
      receive path information specifying attributes of an optical transmission path, wherein the path information includes a distance of the optical path and a number of optical channels transmitted over the optical transmission path;
      based on the path information, identifying a first modulation format for an optical channel, wherein the first modulation format has a uniform distribution of constellation points in the complex plane;
      when a first bit error rate (BER) for the optical channel using the first modulation format for the distance exceeds a threshold value, identifying a second modulation format for the optical channel, wherein the second modulation format has a non-uniform distribution of constellation points in the complex plane, and wherein the second modulation format results in a second BER for the optical channel over the distance that does not exceed the threshold value;
      sending a first command to the optical transmitter to use the second modulation format for the optical channel; and
      sending a second command to the optical receiver to use the second modulation format for the optical channel.

14. The optical transport network of claim 13, wherein the second modulation format has a Gaussian-like distribution of constellation points in the complex plane.

15. The optical transport network of claim 13, wherein the first modulation format provides maximum data throughput capacity available in the optical network for the distance using the uniform distribution of constellation points in the complex plane.

16. The optical transport network of claim 13, wherein the second modulation format is based on at least one of superposition coded mapping using phase-shifted modulation, superposition coded mapping using bit-interleaved coded modulation, iterative polar modulation, or low-density parity check coded modulation with probabilistic shaping.

17. The optical transport network of claim 13, wherein the first modulation format is based on at least one of quadrature amplitude modulation, or quadrature phase shift keying.

18. The optical transport network of claim 13, wherein the optical channels are included in a superchannel.

19. An optical transport network for constellation shaping of modulation formats, the optical transport network comprising:
   an optical transmission path, including an optical transmitter and an optical receiver; and
   a network management system enabled to:
      monitor a first bit error rate (BER) of an optical channel transmitted over the optical transmission path using a first modulation format over a distance, wherein the first modulation format has a uniform distribution of constellation points in quadrature space;
      when the first BER for the optical channel over the distance exceeds a threshold value, identifying a second modulation format for the optical channel, wherein the second modulation format has a non-uniform distribution of constellation points in quadrature space, and wherein the second modulation format results in a second BER for the optical channel over the distance that does not exceed the threshold value;
      sending a first command to the optical transmitter to use the second modulation format for the optical channel; and
      sending a second command to the optical receiver to use the second modulation format for the optical channel.

20. The method of claim 19, wherein the second modulation format has a Gaussian-like distribution of constellation points in the complex plane.

21. The method of claim 19, wherein the first modulation format provides maximum data throughput capacity available in the optical network for the distance using the uniform distribution of constellation points in the complex plane.

22. The method of claim 19, wherein the second modulation format is based on at least one of superposition coded mapping using phase-shifted modulation, superposition coded mapping using bit-interleaved coded modulation, iterative polar modulation, or low-density parity check coded modulation with probabilistic shaping.

23. The method of claim 19, wherein the first modulation format is based on at least one of quadrature amplitude modulation, or quadrature phase shift keying.

24. The optical transport network of claim 19, wherein the optical channels are included in a superchannel.

* * * * *